United States Patent [19]

Szabo

[11] 4,018,866

[45] * Apr. 19, 1977

[54] METAL CARBONATE RECYCLE TO REDUCTION CIRCUIT IN THE CUPRION PROCESS

[75] Inventor: Lester J. Szabo, Prince Edward Island, Canada

[73] Assignee: Kennecott Copper Corporation, New York, N.Y.

[*] Notice: The portion of the term of this patent subsequent to Sept. 28, 1993, has been disclaimed.

[22] Filed: Nov. 3, 1975

[21] Appl. No.: 628,354

Related U.S. Application Data

[63] Continuation of Ser. No. 475,991, June 3, 1974, abandoned, and a continuation-in-part of Ser. No. 311,063, Dec. 1, 1972, abandoned.

[52] U.S. Cl. .................. 423/32; 423/35; 423/53; 423/55; 423/144; 423/150

[51] Int. Cl.² .................. C01G 3/14; C01G 51/12; C01G 53/12

[58] Field of Search .................. 423/32, 33, 35, 50, 423/144, 150, 58, 55, 53; 75/103, 117, 119

[56] References Cited

UNITED STATES PATENTS

| | | | |
|---|---|---|---|
| 2,625,462 | 1/1953 | Fox | 423/50 |
| 2,647,830 | 8/1953 | Allen et al. | 423/32 |
| 2,698,220 | 12/1954 | Erskine | 423/144 |
| 3,734,715 | 5/1973 | Redman | 75/103 |
| 3,751,554 | 8/1973 | Bare et al. | 423/144 |
| 3,810,971 | 5/1974 | Skarbo et al. | 75/117 |
| 3,832,162 | 8/1974 | Smith | 75/117 |
| 3,853,981 | 12/1974 | Hadzeriga | 423/32 |

Primary Examiner—Edward J. Meros
Assistant Examiner—Brian E. Hearn
Attorney, Agent, or Firm—John L. Sniado; Lowell H. McCarter; Anthony M. Lorusso

[57] ABSTRACT

A process in which copper, nickel, cobalt and molybdenum are recovered by direct leaching of comminuted raw manganese nodules after the nodules are reduced in a reduction circuit with an aqueous ammoniacal leach solution containing cuprous ions. An improvement is disclosed which results from recycling a portion of the metal values recovered back to the reduction circuit as a solid basic metal carbonate. The metal carbonate recycle enables the size of the reactors in the reduction circuit to be reduced. The recycle also increases the efficiency of the process by facilitating the solubilization of copper. Another aspect of the invention resides in the advantages of maintaining solubilized copper in amounts between 10 grams per liter and the solubility limit in the reduction circuit.

6 Claims, 3 Drawing Figures

METAL CARBONATE RECYCLE TO REDUCTION CIRCUIT IN THE CUPRION PROCESS

CROSS REFERENCE TO RELATED APPLICATION

This is a continuation of application Ser. No. 475,991 filed June 3, 1974, and a continuation-in-part of Ser. No. 311,063 filed Dec. 1, 1972, both now abandoned.

BACKGROUND OF INVENTION

In co-pending patent application Ser. No. 311,063, the teachings of which are incorporated herein by reference, a process is disclosed in which copper, nickel, cobalt and molybdenum are recovered from raw manganese nodules with an aqueous ammoniacal leach solution containing cuprous ions. In that process (which has come to be called the "cuprion" process) ground manganese nodules are contacted with an ammoniacal leach solution containing cuprous ions in a reaction vessel to reduce the manganese oxides in the nodules to enable metal values such as copper, nickel, cobalt and molybdenum to be solubilized. The nodule residue is washed with an ammoniacal ammonium carbonate solution to remove these entrained metal values from the residue. The reduction liquor is recycled to the reaction vessel in which the manganese nodules are added. To maintain a sufficient amount of cuprous ions, a reducing gas, such as carbon monoxide, is passed through the reaction vessels. The process described in co-pending application Ser. No. 311,063 requires large reactors, or a large number of smaller reactors in order to process a nominal output of metal values.

SUMMARY OF THE INVENTION

In accordance with the present invention, it has been discovered that the volume of reactors required in the reduction circuit is influenced by the copper content of the reduction liquor. The size of the reactors required can be reduced if the amount of solubilized copper in the cuprous ion reduction liquor is increased. Recycling a mixed metal carbonate precipitate to the reduction circuit is a practical way to increase the copper content of the cuprous ion reduction liquor in the reduction circuit.

If the solubilized copper content of the reduction liquor in the reduction circuit is maintained at a level of 10 grams per liter, the size of the reactor required in the process disclosed in co-pending application Ser. No. 311,063 can be reduced by a factor of two. Of course a higher copper content in the reduction liquor makes further reductions in the size of the reduction reactors possible.

Accordingly, it is an object of the present invention to provide an improved process for solubilizing metal values in manganese nodules.

A further object of the present invention is to provide a multistage process for the continuous reduction of manganese nodules by the cuprion process in which the amount of cuprous ions in each stage of the process is relatively high.

A further object of the present invention is to provide a multistage process for the continuous extraction of metal values from manganese nodules by the cuprion process in which the solubilized copper content of the reduction liquor in the reduction circuit is about 10 g/l or greater.

A further object of the present invention is to provide a practical method for increasing the copper content of the reduction liquor in the cuprion process.

Another object of the present invention is to provide an improved cuprion process which includes the steps of recycling a basic metal carbonate feed to the reduction circuit.

DESCRIPTION OF THE PREFERRED EMBODIMENTS

Figure 1:
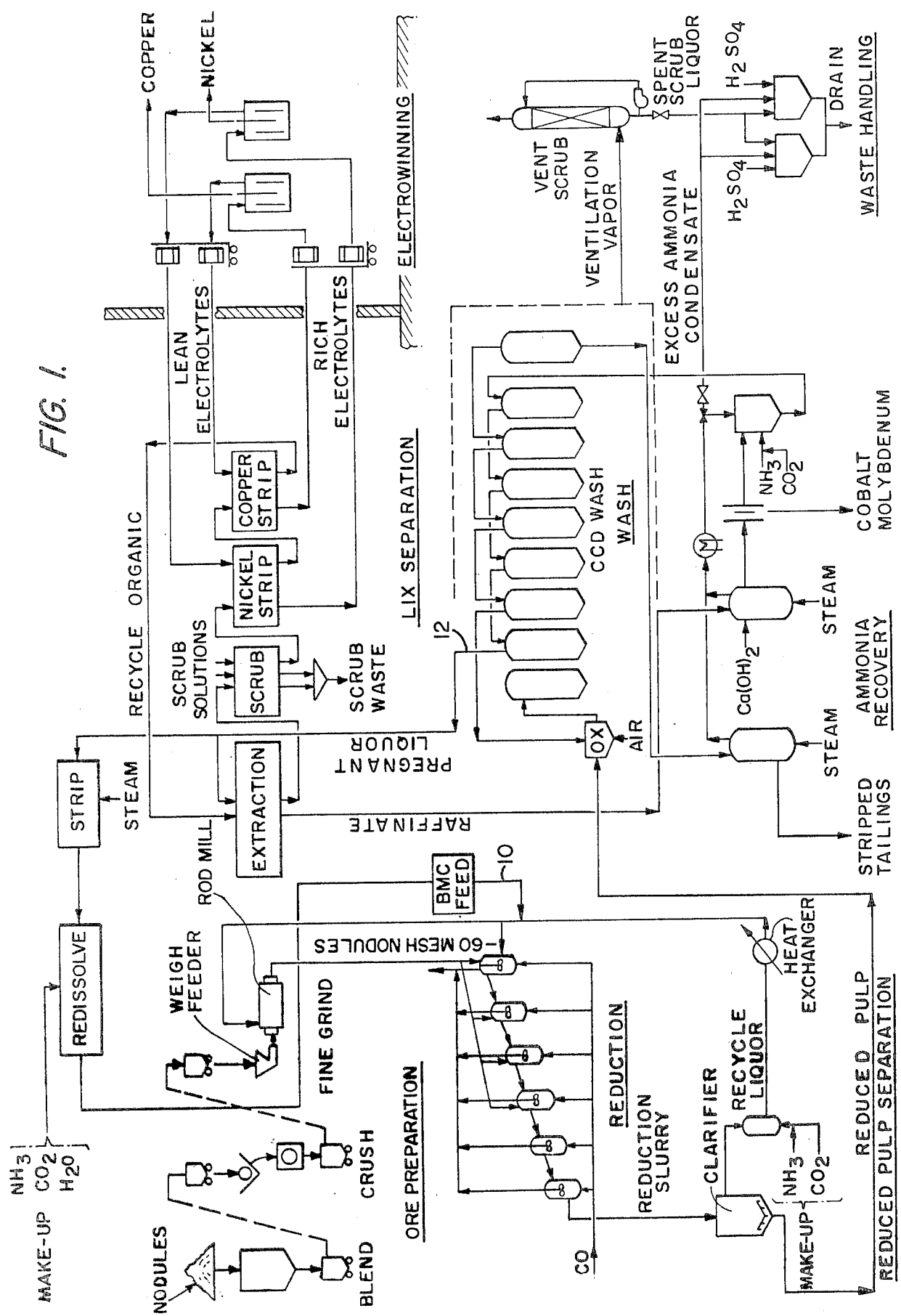
FIG. 1 is a flow sheet illustrating the process of the present invention.

At the outset, the process of the present invention is described in its broadest overall aspects with a more detailed description following. The present invention is directed to the recovery of metal values from manganese deep sea nodules. For the purpose of this patent specification and claims, complex ores which are found on the deep sea floor of oceans and lakes containing manganese, iron, copper, nickel, molybdenum, cobalt and other metal values are variously referred to as deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The character and chemical content of the deep sea nodules may vary widely depending upon the region from which the nodules are obtained. The Mineral Resources of the Sea John L. Mero, Elsevier Oceanography Series, Elsevier Publishing Company, 1965, discusses on pgs. 127–241 various aspects of manganese nodules. For a detailed chemical analysis of nodules from the Pacific Ocean see pgs. 449 and 450 in The Encyclopedia of Oceanography, edited by R. W. Fairbridge, Reinhold Publishing Corp., N.Y. 1966, and U.S. Pat. No. 3,169,856. For the purpose of this invention the complex ores will be considered as containing the following approximate metal content range on a dry basis:

| METAL CONTENT ANALYSIS RANGE | |
|---|---|
| Copper | 0.8 – 1.8% |
| Nickel | 1.0 – 2.0% |
| Cobalt | 0.1 – 0.5% |
| Molybdenum | 0.03 – 0.1% |
| Manganese | 10.0 – 40.0% |
| Iron | 4.0 – 25.0% |

The remainder of the ore consists of oxygen as oxides, clay minerals with lesser amounts of quartz, apatite, biotite, sodium and potassium feldspars and water of hydration. Of the many ingredients making up the manganese nodules, copper and nickel are emphasized because, from an economic standpoint, they are the most significant metals in most of the ocean floor ores.

In the cuprion process, raw manganese deep sea nodules are reduced with cuprous ions ($Cu^+$) in an aqueous ammoniacal ammonium carbonate solution. The cuprous ions reduce the manganese in the nodules which enables metal values such as copper, nickel, cobalt and molybdenum to be dissolved while leaving undesirable metals such as iron in the solid residue. In the reduction process, the manganese dioxide in the deep sea nodules is reduced by cuprous ion to manganese carbonate according to the reaction

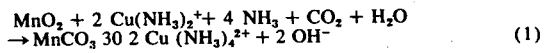

$$MnO_2 + 2\ Cu(NH_3)_2{}^+ + 4\ NH_3 + CO_2 + H_2O$$
$$\rightarrow MnCO_3\ 30\ 2\ Cu\ (NH_3)_4{}^{2+} + 2\ OH^- \qquad (1)$$

Cupric ions indicated in equation (1) are reduced back to the cuprous state with carbon monoxide according to the reaction

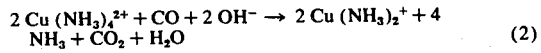

$$2\ Cu\ (NH_3)_4{}^{2+} + CO + 2\ OH^- \rightarrow 2\ Cu\ (NH_3)_2{}^+ + 4$$
$$NH_3 + CO_2 + H_2O \qquad (2)$$

Cuprous ion is consumed in reaction (1) and is regenerated by reaction (2). The net overall reaction for the reduction process is the sum of equation (1) and (2), or equation (3):

$$MnO_2 + CO \rightarrow MnCO_3 \qquad (3)$$

In order to provide an efficient reactor system for the cuprion process, it is necessary to balance the rate of reaction (1) and (2).

In order to maintain enough cuprous ions at all stages of the cuprion process by regeneration from cupric ions, the cuprous ion concentration must be maintained at a fairly high level because the amount of catalyst available for reducing cupric ions to cuprous ions is controlled by the actual amount of cuprous ions. In fact, if the level of cuprous ions is below about 2 grams per liter (at atmospheric pressure and temperature below approximately 40° C) effective regeneration of cuprous ions is not commercially feasible.

One method of maintaining the cuprous ion concentrations fairly high at all levels of the process is to inject the nodule feed stock at multiple points. This multipoint injection facilitates the regeneration of cuprous ions by reducing the possibility that the nodule will exhaust the supply of cuprous ions in any one reactor by reacting with them.

In accordance with the present invention, it has been discovered that the efficiency of the cuprion process is increased if the soluble copper content of the reduction liquor in the reduction circuit is maintained at a level of about 10 g/l or greater. In connection with the term "soluble copper", as used throughout this specification and claims soluble copper is intended to describe copper in an ionic state, that is in either its cuprous or cupric form.

In accordance with the present invention, the amount of soluble copper in the reduction liquor in the reduction circuit is increased by diverting a portion of the pregnant liquor that could otherwise be sent to LIX extraction, stripping the liquor to obtain a metal carbonate precipitate containing basic copper carbonate as well as nickel, cobalt and molybdenum carbonates, and recycling the precipitate to the reduction circuit in sufficient quantity to maintain the desired level of soluble copper in that circuit. Without this metal carbonate recycle the soluble copper level in the reduction liquor will be only 4–6 g/l. With a basic metal carbonate recycle, the soluble copper level in the reduction liquor can be increased to any desirable level up to the solubility limit. At this point it should be noted that the recycle solid is not pure oxide but a mixed oxide carbonate-hydroxide precipitate of varying composition. It goes into solution as metal amine carbonate.

The process of the present invention is further illustrated by the following example in conjunction with FIG. 1 of the drawing. At the outset, however, it is emphasized that the following description relates to a procedure that has been performed in a pilot plant. By extrapolating the results obtained from the pilot plant, however, one skilled in this art can design a commercial plant for processing large quantities of nodules.

The pilot plant was designed for one half tons per day nodule throughout, based on a 3½ percent solid slurry and with up to a three hour hold-up in the reduction section.

The process performed in the pilot plant can be broken down into the following sections:
1. Ore Preparation
2. Reduction-Leach
3. Oxidation and Wash-Leach
4. BMC Recycle
5. LIX Separation of the Metals
6. Electrowinning

ORE PREPARATION

The nodules utilized in the pilot plant process are received in 55 gallon drums in the condition that they are in after being mined from the deep sea ocean bottom. To facilitate processing in the pilot plant, the nodules are air dried. After they are dried, they are then blended, using the cone and quarter technique before going into the primary crushing circuit. The primary crushing circuit consists of a Jacobson Full Nelson crusher to reduce the raw nodules to minus one inch. Thereafter, the nodules are passed through a Stedman double row cage mill to reduce the ore further to minus 6 mesh. The nodules are then conveyed away on a belt feeder to drums for storage or further processing.

The second grinding circuit is the final stage of ore preparation before the nodules enter the reduction stage. This circuit consists of a hopper, filled from the drums of cage milled ore, located on top of a hydraulic weigh feeder. The weigh feeder is used to meter nodules at a given rate into an open circuit rod mill for final grinding. The rod mill reduces the nodules from a particle size of minus six mesh to a particle size of approximately minus sixty mesh. As the nodules enter the rod mill, they are wetted with a synthetic sea water which brings the nodules up to approximately 40% moisture. This moisture content corresponds to the moisture which would be present in nodules as they are brought up from the sea bottom. At this point, it should be noted that in a commercial operation the nodules would be processed directly after being mined from the ocean bottom, thus, the foregoing steps of drying and wetting the nodules would be unnecessary. However, for purposes of a pilot plant operation it was found convenient to air dry the nodules and later wet the nodules so that they had a moisture content equivalent to that of freshly mined nodules.

It has been found advantageous to add recycle reduction liquor to the rod mill. In a commercial process recycle liquor can be added to the grinding mill in order to provide a liquor to facilitate grinding and reduce the dust problem without introducing more water into the circuit which would cause undesirable dilution. Of course, the recycle reduction liquor is advantageous in maintaining the proper copper concentration in the reaction circuit as well to provide liquor which is useful in the grinding process itself. Details of the recycle liquor circuit are amplified below.

REDUCTION-LEACH

The reduction-leach portion of the pilot plant is the section where the modules are chemically reacted to make the metals of interest soluble in a strong ammoniacal ammonium carbonate solution. This is accomplished by reducing and converting the $MnO_2$ in the nodules to $MnCO_3$.

After leaving the rod mill, the nodules are passed through a conduit into a vibrator (not shown). The purpose of the vibrator is to remove any tramp material. The vibrator utilized is a Sweco vibrating screen. The material that enters and leaves the vibrator is actually a liquid slurry. Connected to the vibrator is a surge tank (not shown). The purpose of the surge tank is to serve as a storage unit so that the process plant will not have to be shut down in the event that there is a malfunction in some piece of ore preparation machinery. After leaving the surge tank, a feed pump pumps the slurry to the reduction circuit.

The reduction circuit includes six reactors connected in series. These reactors are 60 gallon capacity reactors which are used to a 42 gallon capacity in the actual processing. Each reactor is formed of 316 stainless steel and are outfitted with agitators, pressure gages, level alarms, and gas sparging equipment. The reduction and leaching within these reactors is performed at a temperature between the range of 40°–70° C, a pH between the range of 10.0–10.8, and at a pressure of approximately one atmosphere.

Gas sparging is directed underneath the agitator from the bottom of the reactor where a reduction gas containing 95 percent carbon monoxide and 5 percent hydrogen is introduced. This mixture is used because it is similar to a reduction gas mixture that is available in commercial quantities. Of course, hydrogen is unnecessary in the process. Indeed, the only gas necessary for the process is carbon monoxide. The off gas coming out of the reactors first goes through condensers which remove some of the water in the gases before going to off gas rotameters which give an indication of the amount of gases coming out of a reactor. The off gases go through an ammonia scrubber and are exited to the atmosphere.

The reactors themselves are outfitted with gravity overflows so that there is a cascading system from the first through the sixth reactor. In one important embodiment of the multipoint injection system, each of the first four reactors is fed an equal amount of feed stock. That is, 25 percent of the slurry being pumped from the ore preparation circuit will go into each of the first four reactors. It should be noted, however, that there are a large number of possible ways of accomplishing multipoint injection. That is, the nodule slurry can be injected into two, three, five or more reactors and the amount of slurry going into any given reactor need not be equal to the amount going into the others.

It has been found advantageous, however, that there be no nodule injection into at least the last reactor. That is, each portion of nodules should pass through two stages in progression; therefore, these should be no nodule injection in the last stage. It should be noted that in the pilot plant process there is no nodule injection in the last two stages. Each reactor contains a mechanical impeller to achieve mechanical agitation which disperses the gas and suspends the solids. It has been established that the reaction rate of cuprous ion regeneration is influenced by gas-liquid mass transfer rate of carbon monoxide. The rate is affected primarily by the extent of gas-liquid interfacial area, which is in turn affected by the method used to disperse the gas.

While the nodules are fed to the first four reactors, carbon monoxide is sparged into the bottom of each reactor as required. The slurry in these reactors is approximately 3.5 percent solids and the average residence time in the system is twenty minutes per stage. The slurry overflowing the last reactor is flocculated to enhance settling before entering a clarifier. The clarifier is used to separate the liquid from the solids.

The reduction-leach circuit also includes a gas metering system. As set forth above, the reducing gas is 95 percent carbon monoxide and 5 percent hydrogen. It has also been found advantageous to include a 1 percent methane tracer in the reducing gas. The methane was used as an aid in establishing material balances. The reducing gas is fed from portable cylinders through a pressure reducing valve and a gas totalizer. The gases are metered individually to each of the six reactors as required to maintain the cuprous ion within various control ranges. The gases are also sampled by gas chromatographs.

START-UP

The process of the present invention is directed toward a continuous process in which nodules are continuously processed to produce various desirable metals. In order to reach a continuous steady state, the reactor vessels must be loaded with start-up materials. Thus, each of the six reactors are filled with an ammonia-ammonium carbonate solution containing approximately 100 grams per liter total ammonia and approximately 15 grams per liter total carbon dioxide. After the reactors are filled with the ammonia-ammonium carbonate solution, copper metal is added and is partially oxidized. The metal is added as a copper powder and is oxidized to convert some of the copper to cuprous ions. Hydroxyl ions are also produced with the cuprous ions. Enough copper metal is added so that 10 grams per liter copper in solution results. The next step in the start-up procedure is to check the cuprous ion concentration. Thus, the mixture in each reactor is analyzed to make sure that the cuprous ion concentration is at an acceptable level of about 7 grams per liter. If more cuprous ions are needed, this can be accomplished by passing the reducing gas through the bottom of the reactor. The first three reactors have pH loops which consist of a finger pump which pumps the solution to a housing which contains a pH electrode. The pH is then measured in a readout on a control panel. The pH is a valuable control device and can be used to indicate whether or not the carbon dioxide, ammonia or cuprous ions have gone off the specified limits.

After the reactor vessels have been loaded for start-up as set forth above, the manganese nodules are added to the first four reactors. The total rate of feed to the four reactors is about 30 pounds per hour of nodules. As the nodules are being fed into the reactors, carbon monoxide is spraged through the bottom of the reactors at a total rate of about 70 standard cubic foot per hour. At this point, it should be noted that the amount of carbon monoxide that is fed into each stage of the reactor is controlled by the cuprous ion concentration of the contents of any given reactor. This is determined by analyzing the contents of the reactor periodically. During start-up, this is done every half hour and is continued once an hour while the process is in the steady state stage.

Approximately 120 gallons per hour of reduction slurry enters the clarifier. The solids leave the bottom of the clarifier in the form of a slurry with approximately a 40 percent solids content. The overflow from the clarifier is clear liquid which constitutes the recycle reduction liquor. However, after leaving the clarifier, the recycle reduction liquor enters a surge tank whereupon it is passed into an ammonia makeup unit. Gaseous ammonia and carbon dioxide are sparged into the ammonia makeup unit in order to keep the ammonia and carbon dioxide content of the liquid at a prescribed level. At steady state, that level is approximately 100 grams per liter ammonia and the $CO_2$ content about approximately 25 grams per liter. After leaving the makeup unit, the liquid is pumped by a metering pump through a heat exchanger into the first reactor and the grinding mill. The heat exchanger removes heat that was generated in process.

OXIDATION AND WASH-LEACH

In the oxidation and wash-leach circuit, the clarifier underflow is combined with second stage wash liquor and the resulting slurry is oxidized with air to convert the cuprous ion in the clarifier underflow to cupric ion to facilitate future processing. The oxidized slurry is then pumped to a countercurrent decantation system (CCD) consisting of seven stages of countercurrent washing units. The wash-leach steps are carried out on a batch basis in nine tanks. It should be noted that in the pilot plant nine stages are used to simulate a countercurrent wash system. Although this system is not truly countercurrent, it has been able to demonstrate that a seven reactor countercurrent system is advantageous. The two extra units used in the pilot plant are necessary because one unit is either being filled or is being emptied. In the wash-leach system, the metal solubilization is completed as the displacement wash process is carried out. Fresh wash liquor is added to the seventh stage of the system as a solution containing 100 grams per liter ammonia and 100 grams per liter carbon dioxide. Liquor is transferred from one tank of the settled slurry every 12 hours to another appropriate tank in the system to affect the countercurrent washing. The carbon dioxide concentration varies throughout the washing system and exits in the pregnant liquor which contains approximately 65 grams per liter $CO_2$. This decrease in $CO_2$ concentration is due to the fact that the slurry entering the oxidation and wash-leach circuit has a liquor phase which contains only 25 grams per liter $CO_2$. Pregnant liquor, containing the metals to be recovered, is decanted from the first wash stage and pumped to a surge tank. Fresh ammonia solution without metals is added to the last solids wash stage. The metal values in solution range from approximately 0 in the fresh wash liquor to between 6 and 8 grams per liter copper and 5 and 10 grams per liter nickel in the pregnant liquor. Of course, other metal values are also present in the pregnant liquor but nickel and copper are the major metal values of interest.

After the wash-leach step, the pregnant metal bearing liquor is piped off for further processing as is explained below. The second stage wash is recycled back to the oxidation reactor. The tailings, which are nothing more than reduced nodules washed of all their non-ferrous metal values and with the manganese converted to manganese carbonate, are sent to a surge tank. From the surge tank, they are then pumped to a steam stripping operation where the ammonia and $CO_2$ are driven off. The tailings are then drummed. The ammonia and $CO_2$ obtained in the steam stripper may be recycled.

BMC RECYCLE

A small steam 10 of basic metal carbonates (BMC) is recycled to the first stage as required to maintain the total copper in the system at an acceptable level. This stream of basic metal carbonate compensates for unsolubilized copper leaving the reduction loop in the clarifier underflow. To produce stream 10 of basic metal carbonates, a portion of the pregnant liquor 12 (wash effluent) from the oxidation and wash-leach circuit is steam stripped on a batch basis to remove ammonia and carbon dioxide and to precipitate the basic metal carbonates. The precipitated basic metal carbonates are dissolved in an aqueous solution containing approximately 60 g/l $NH_3$ and 60 g/l $CO_2$. This BMC feed is pumped to the first stage of the reduction circuit.

The amount of BMC feed added to the reduction circuit varies according to the amount of soluble copper present in the reduction reactors and the copper concentration desired in the reduction circuit. It has been found advantageous to maintain the soluble copper content of the reduction circuit at a level of 10 g/l or greater. Thus, as the amount of soluble copper in the reduction circuit is depleted, BMC feed is prepared and recycled to the reduction circuit. Of course, the basic metal values of the BMC feed is controlled by the base metal content of the nodules processed. The stream 10 of basic metal carbonates primarily contain solubilized copper and nickel; however, small amounts of molybdenum and cobalt are also present. It should be apparent that it is the amount of copper metal in the BMC feed which controls the amount of BMC recycle feed that is added to the reduction circuit. Further details of the BMC feed are set forth below in a section entitled SPECIFIC DETAILS OF THE BMC RECYCLE.

LIX SEPARATION

The pregnant liquor contains various metal values including copper, nickel, cobalt and molybdenum. In the LIX separation circuit, the object is to separate the copper, nickel, cobalt and molybdenum from each other and from the pregnant liquor. Initially, the copper and nickel are co-extracted by an organic extractant in a series of mixer/settler units. The organic extractant is LIX-64N in a kerosene base. LIX-64N is an extractant sold by General Mills Chemicals, Inc.

The copper and nickel free liquor (raffinate) is sent to a storage tank before it is steam stripped.

The organic extractant which contains copper and nickel values is washed with an $NH_4 HCO_3$ solution followed by an ammonium sulfate solution to remove ammonia picked up during extraction. This scrubbing operation is carried out in another series of mixer settlers. The organic extractant is then stripped with a weak $H_2SO_4$ solution (pH about 3) to preferentially remove nickel. Thereafter, the copper is stripped, which is accomplished by using a stronger (160 g/l) $H_2SO_4$ solution. The copper and nickel free organic extractant is recycled to the metal extraction circuit of the LIX process.

The raffinate which contains only cobalt, molybdenum and some trace impurities that were not extracted into the organic phase is sent into a surge tank for future processing to recover cobalt and molybdenum. In the cobalt and molybdenum recovery circuit, the ammonia and $CO_2$ are stripped from the raffinate. The ammonia and $CO_2$ are condensed and sent back to the process for recycling. Hydrated lime is then added to the raffinate in a steam stripper. The resulting slurry is agitated and then allowed to settle. The solution which no longer contains cobalt and molybdenum is recycled back to the process as fresh wash liquor. Ammonia and $CO_2$ are added to the solution to bring it up to the prescribed concentration.

ELECTROWINNING

Metal recovery is accomplished by electrowinning copper and nickel from the solution prepared in the LIX plant as described above. This process is performed on a batch basis for the copper recovery and on a continuous basis for the nickel recovery in a separate plant. The metal containing solutions are transferred once a day.

SPECIFIC DETAILS OF BMC RECYCLE

A comparison of the process of the present invention with the process of co-pending application Ser. No. 311,063 is set forth in the discussion below which is to be taken in conjunction with FIGS. 2 and 3.

Figure 2:
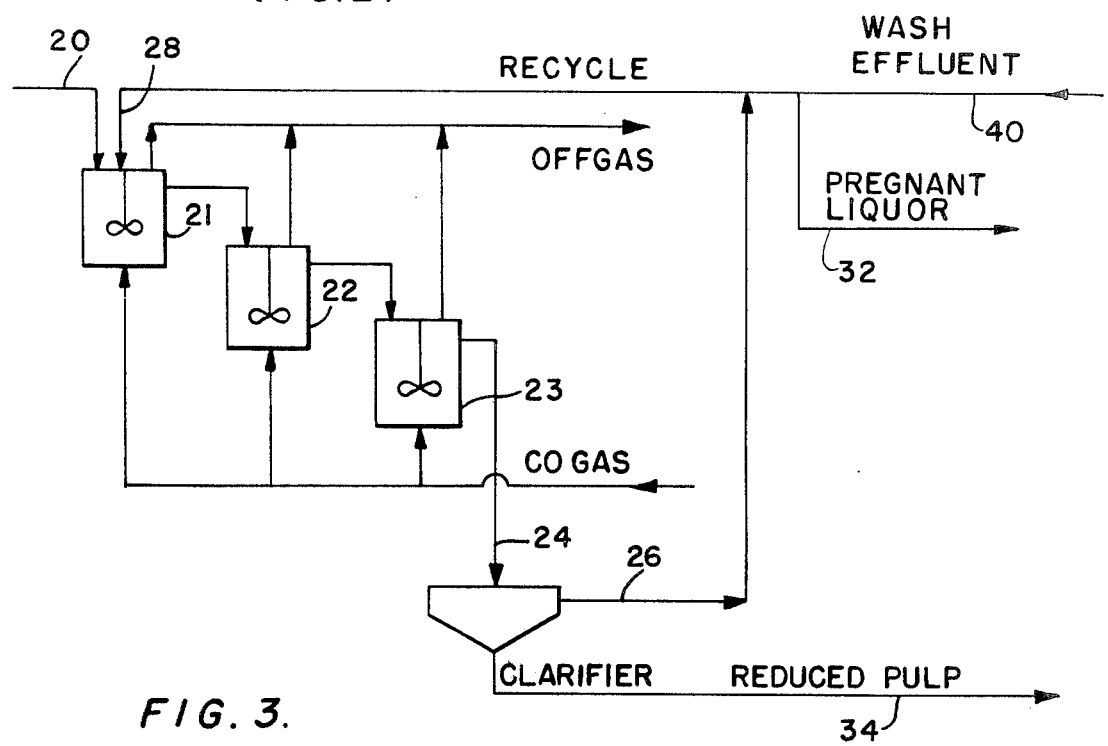
FIG. 2 is a schematic diagram of the process disclosed in co-pending application Ser. No. 311,063.

The process disclosed in application Ser. No. 311,063 is set forth schematically in FIG. 2. As is shown in FIG. 2, in the process disclosed in that application, nodules 20 are treated in reaction vessels 21, 22, 23. The processed nodules then flow into a clarifier at 24. Pregnant liquor is taken from the clarifier at 26. A portion of the pregnant liquor is recycled at 28 into reactor 21. The portion of the stream of pregnant liquor 32 that is not recycled to reactor 21 is sent to the extraction circuit. Reduced pulp 34 is sent to the wash circuit.

Figure 3:
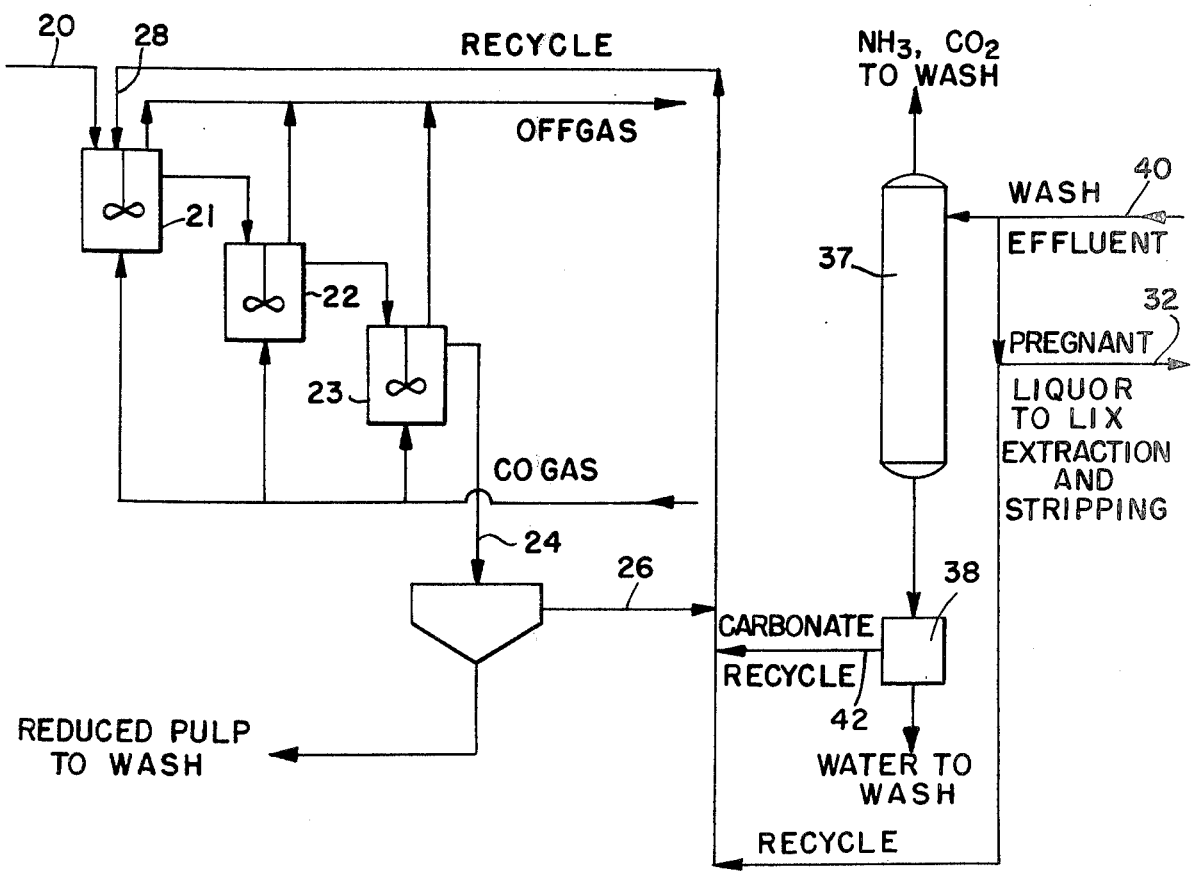
FIG. 3 is a schematic diagram similar to FIG. 2 but showing the process of the present invention.

In the process of the present invention, as is shown schematically in FIG. 3, about one quarter of the wash effluent stream 40 is diverted to a steam stripping. At this point it should be noted that BMC recycle rate depends on the copper concentration desired in the reduction circuit. Sending about one quarter of the wash effluent (pregnant liquor) to a BMC steam stripper will increase the copper concentration in the reduction reactors nearly two and one half times (from 4.3 to 10 g/l). The basic carbonate precipitate formed in the steam stripping section 37 is filtered at 38, is dissolved in water containing $NH_3$ and $CO_2$ and is sent to the reducing circuit with stream 28. The remaining portion of the wash effluent 40 is split. Stream 28 is recycled directly to the reduction circuit and pregnant liquor stream 32 is sent to LIX extraction. The BMC recycle increases the copper content as well as the total metal content of a reduction liquor in vessel 21. The upper limit of copper concentration that can be reached in this manner is controlled by the solubility limit of metal amine carbonates which is between 40 and 60 g/l.

The following is an example of the steam stripping which occurs within vessel 37. 135 gallons from wash effluent stream 40 containing 4–8 g/l copper and 5–10 g/l nickel, was steam stripped batchwise. The temperature during stripping rose from an initial 180° F to 216° F. The precipitate was black and precipitate analysis showed 13.9% Cu, 17.7% Ni, and 5.95% $CO_2$ indicating a high percentage of cupric oxide in the cake. The precipitate was filterable. The residual liquor analyzed 0.095 g/l Cu and 0.154 g/l Ni, indicating adequate removal of copper and nickel values.

The precipitate was dissolved in a water solution containing 100 g/l $NH_3$ and 45 g/l $CO_2$. Dissolution in this solution at ambient temperature (25° C) was completed in less than 15 minutes. 99.8% Cu and 99.4% Ni solubility was obtained.

A comparison of the process of the present invention with the process disclosed in co-pending application Ser. No. 311,063 is illustrated further in Table A below.

TABLE "A"

| Stage reference numbers in FIGS. 2 & 3 | 20 Nodule Feed | not shown Wash Liquor | 40 Wash Effluent | 32 Pregnant Liquor | | 42 Carbonate Strip Liquor | | 26 Reduced Liquor | |
|---|---|---|---|---|---|---|---|---|---|
| | lbs/hr | lbs/hr | lbs/hr | lbs/hr | Cu g/l | lbs/hr | Cu g/l | lbs/hr | Cu g/l |
| without recycle-FIG. 2 | 29.5 | 85.0 | 85.3 | 85.3 | 3.6 | — | — | 42.5 | 4.3 |
| with carbonate recycle-FIG. 3 | 29.5 | 85.0 | 85.3 | 47.6 | 6.5 | 37.7 | 6.5 | 42.5 | 10.0 |

At this point it should be noted that the process of the present invention can be accomplished without multiple point injection of the nodules. Indeed, the disclosure appearing above relative to FIGS. 2 and 3 is directed to a continuous process with single point injection of the nodules. By following the teachings of the present invention, the copper level of the reactor vessels can be increased in an efficient manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a process in which metal values selected from the group consisting of copper, nickel, cobalt and molybdenum are recovered from a manganese containing ore by introducing the ore into a reaction vessel containing cuprous ions in an aqueous ammoniacal ammonium carbonate leach solution to allow the cuprous ions to reduce the manganese oxides in the ore to enable the metal values to be solubilized in the aqueous ammoniacal ammonium carbonate leach solution and in which cuprous ions are continuously regenerated in the leach solution by a reducing gas wherein the improvement comprises leaching the metal values from said manganese containing ore with said leach solution, recovering a portion of the metal values solubilized in the leach solution as a mixed metal carbonate precipitate and recycling the mixed metal carbonate back to said reaction vessel to increase the solubilized copper content of the leach solution in the reaction vessel.

2. In a process in which metal values selected from the group consisting of copper, nickel, cobalt and molybdenum are recovered from a manganese containing ore by introducing the ore into a reduction reaction vessel in which the ore is reduced, said reduction reaction vessel containing an aqueous ammoniacal ammonium carbonate leach solution of cuprous ions to allow the cuprous ions to reduce the manganese oxides in the ore to enable the metal values to be solubilized in the aqueous ammoniacal ammonium carbonate leach solution and in which cuprous ions are continuously regenerated in the leach solution by a reducing gas wherein the improvement comprises leaching metal values from said manganese containing ore with said leach solution, recovering a portion of the metal values solubilized in the leach solution, after the solubilized metal values leave the reduction reaction vessel, as a mixed metal carbonate precipitate and recycling a sufficient amount of the mixed metal carbonate back to the reduction reaction vessel so as to maintain the soluble copper content of the reduction reaction vessel at a level of at least 10 grams per liter.

3. The process as set forth in claim 2 wherein said solubilized metal values bearing liquor is directed to an extraction circuit and wherein a portion of the pregnant liquor is diverted from the extraction circuit, is steam stripped to obtain a metal carbonate precipitate containing basic copper carbonate and the precipitate is recycled to the reduction reaction vessel in sufficient quantities to maintain a desired level of soluble copper in the reduction reaction vessel.

4. The process as set forth in claim 3 wherein the precipitate is recycled at a rate sufficient to maintain the soluble copper level in the reduction liquor in the reduction reaction vessel between the range of 10 grams per liter to the solubility limit.

5. The process as set forth in claim 2 further comprising washing and leaching the reduced ore with an aqueous solution containing ammonia and carbon dioxide and wherein a portion of the pregnant metal bearing liquor from the circuit in which the reduced ore is washed and leached is steam stripped to remove ammonia and carbon dioxide and to precipitate the basic metal carbonate and wherein the precipitated basic metal carbonates are recycled back to the reduction reaction vessel.

6. The process as set forth in claim 5 wherein the precipitated basic metal carbonates are dissolvd in an aqueous solution containing ammonia and carbon dioxide and are recycled as a stream to the reduction reaction vessel.

* * * * *